(12) United States Patent
Jiang et al.

(10) Patent No.: US 11,416,546 B2
(45) Date of Patent: Aug. 16, 2022

(54) CONTENT TYPE DETECTION IN VIDEOS USING MULTIPLE CLASSIFIERS

(71) Applicant: HULU, LLC, Santa Monica, CA (US)

(72) Inventors: Yunsheng Jiang, Beijing (CN); Xiaohui Xie, Beijing (CN); Liangliang Li, Beijing (CN)

(73) Assignee: HULU, LLC, Santa Monica, CA (US)

( * ) Notice: Subject to any disclaimer, the term of this patent is extended or adjusted under 35 U.S.C. 154(b) by 539 days.

(21) Appl. No.: 15/926,569

(22) Filed: Mar. 20, 2018

(65) Prior Publication Data

US 2019/0294729 A1   Sep. 26, 2019

(51) Int. Cl.
*G06F 16/78* (2019.01)
*G06F 16/783* (2019.01)
*H04N 21/234* (2011.01)
*G06V 20/40* (2022.01)

(52) U.S. Cl.
CPC ......... *G06F 16/7844* (2019.01); *G06V 20/41* (2022.01); *G06V 20/46* (2022.01); *H04N 21/23418* (2013.01)

(58) Field of Classification Search
CPC .................................................. G11B 27/102
See application file for complete search history.

(56) References Cited

U.S. PATENT DOCUMENTS

| | | | |
|---|---|---|---|
| 7,783,106 B2 * | 8/2010 | Cooper | G06F 16/7847 382/173 |
| 9,465,996 B1 | 10/2016 | Greene | |
| 2010/0034509 A1 | 2/2010 | Dodd | |
| 2011/0007366 A1 * | 1/2011 | Sarkar | G06K 9/00456 358/462 |
| 2013/0132382 A1 | 5/2013 | Kuznetsov et al. | |
| 2013/0259390 A1 * | 10/2013 | Dunlop | G06K 9/00718 382/224 |
| 2015/0229867 A1 | 8/2015 | Jojic et al. | |
| 2016/0034786 A1 * | 2/2016 | Suri | G06K 9/6256 382/159 |
| 2016/0173941 A1 | 6/2016 | Gilson et al. | |
| 2016/0342844 A1 | 11/2016 | Kansara | |
| 2017/0337271 A1 * | 11/2017 | Lee | G06K 9/6276 |
| 2017/0337427 A1 | 11/2017 | Kansara | |

OTHER PUBLICATIONS

Netflix Technology Blog entitled: "Extracting Contextual Information From Video Assets" by Apurva Kansara; downloaded Jan. 10, 2018.

(Continued)

*Primary Examiner* — Daniel T Tekle
(74) *Attorney, Agent, or Firm* — Kwan & Olynick LLP

(57) ABSTRACT

In one embodiment, a method receives a set of frames from a video at a first classifier. The first classifier classifies the set of frames with classification scores that indicate a confidence that a frame contains end credit content using the first classifier using a first model that classifies content from the set of frames. A second classifier then refines the classification scores from neighboring frames in the set of frames using a second classifier using a second model that classifies classification scores from the first classifier. A boundary point is selected between a frame in the set of frames considered not including end credit content and a frame in the set of frames including end credit content based on the refined classification scores.

21 Claims, 9 Drawing Sheets

(56) References Cited

OTHER PUBLICATIONS

Benezeth et al.: "Unsupervised Credit Detection In TV Broadcast Streams"; 2010 IEEE International Symposium on Multimedia; 10 pages.
International Search Report and Written Opinion for International Appln. No PCT/US2019/022080 dated Jun. 26, 2019, 9 pages.
European Application Serial No. 19770779.7, Search Report dated Jan. 4, 2022, 11 pgs.
Jianjun Huang Ed—Anonymous : "Video Break Detection based on Similarity Analysis and Temporal Statistical Characteristics", Proceedings / 2006 IEEE International Conference on Multimedia and Expo, ICME 2006 : Jul. 9-12, 2006, Hilton, Toronto, Ontario, Canada, IEEE Service Center, Piscataway, NJ, Jul. 9, 2006 (Jul. 6, 2006), pp. 1821-1824, XP032965119, DOI: 10.1109/ICME.2006. 262907 ISBN: 978-1-4244-0366-0 p. 1822-p. 1823.
Jinqiao Wang et al: "A Multimodal Scheme for Program Segmentation and Representation in Broadcast Video Streams", IEEE Transactions on Multimedia, IEEE, USA, vol. 10, No. 3, Apr. 1, 2008 (Apr. 1, 2008), pp. 393-408, XP011346512, ISSN: 1520-9210, DOI: 10.1109/TMM.2008.917362 * p. 394-p. 401.
Zhang et al: "A New Shot Boundary Detection Algorithm", Advances in Multimedia Information Processing : Proceedings / PCM 2001, Second IEEE Pacific Rim Conference on Multimedia, Beijing, China, Oct. 24-26, 2001 (Book Series: Lecture Notes in Computer Science—LNCS); [Lecture Notes in Computer Scienc, vol. 2195, Oct. 24, 2001 (Oct. 24, 2001), pp. 63-70, XP002528778, DOI: 10.1007/3-540-45453-5_9 ISBN: 978-3-540-42680-6 p. 66-p. 67.

* cited by examiner

| Frame 99 | Frame 100 | Frame 101 | Frame 102 | Frame 103 | Frame 104 | Frame 105 | Frame 106 | Frame 107 | Frame 108 |
|---|---|---|---|---|---|---|---|---|---|
| 0.064 | 0.068 | 0.061 | 0.154 | 0.612 | 0.958 | 0.999 | 0.993 | 0.998 | 0.996 |

CONTENT TYPE DETECTION IN VIDEOS USING MULTIPLE CLASSIFIERS

BACKGROUND

When a video, such as a television show or movie, is ending, most users are not interested in watching the end credits, which typically list contributors who were part of the video, such as the actors, actresses, directors, etc. A video delivery service may want to present the users with other recommended content, such as the next episode of the show being currently watched, similar movies, etc., once the users reach the start of the end credits. The recommendation engine may provide users with an uninterrupted viewing experience or a better post-play experience by allowing users to jump straight into watching a next video without having to watch the end credits, which may increase users' viewing time on the video delivery service.

To provide the recommendations, the video delivery service needs to determine the start time of the end credits. One method of determining the start time of the end credits requires an administrator to manually watch the video and then mark the start time of the end credits. The manual method is time-consuming and leads to a large cost in man hours. Also, the administrator may not be able to mark exactly when the end credits start on the first try. This may require that the administrator stop and start watching the video in slow motion to determine the exact start time of the end credits, which makes any determination even slower.

DETAILED DESCRIPTION

Figure 1:
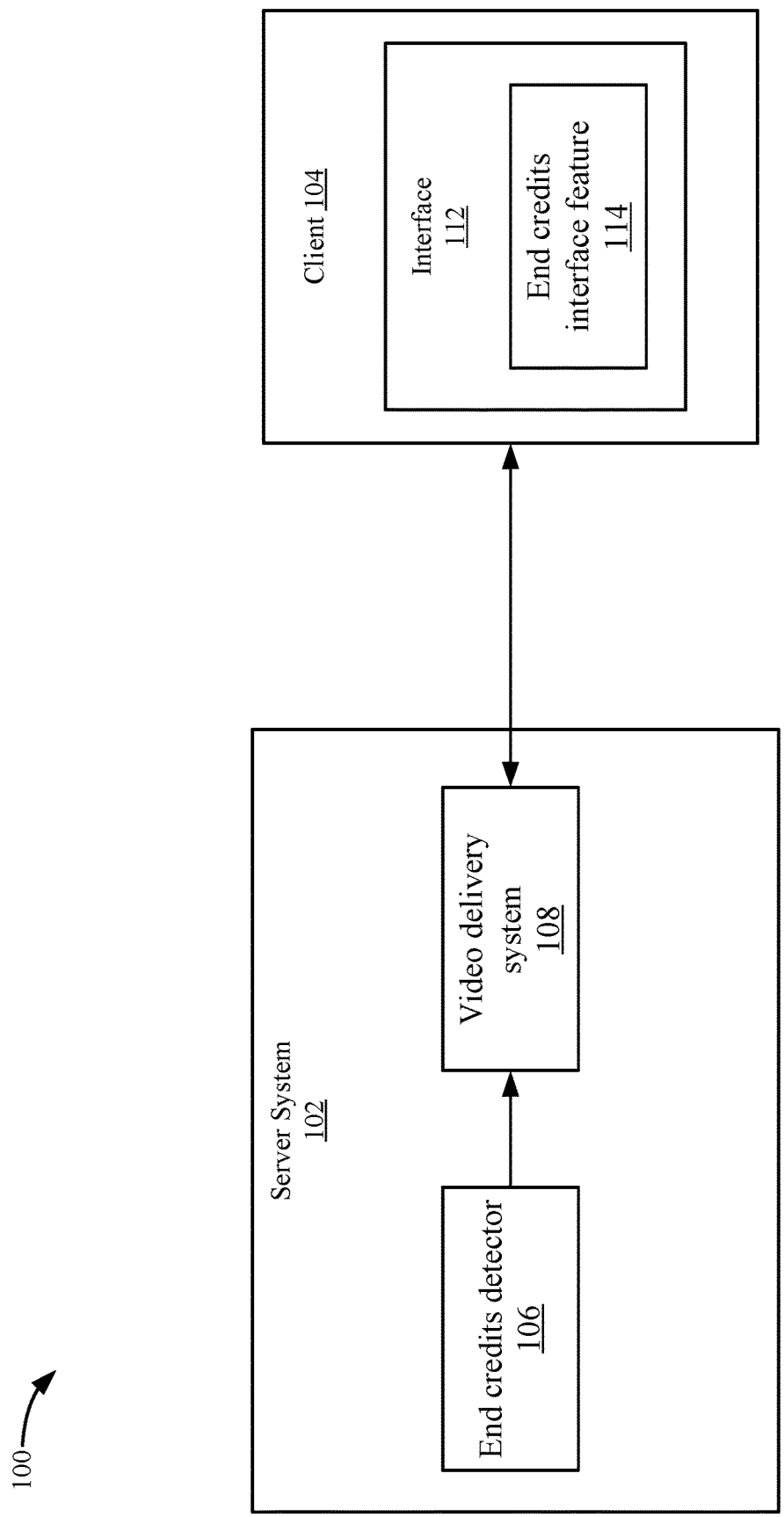
FIG. 1 depicts a simplified system for selecting a boundary point for the start of end credits in videos according to some embodiments.

Described herein are techniques for a video analysis system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

A video delivery system selects a start point for the end credits in a video. The video delivery system can extract frames near the end of the video using a sampling rate, such as one frame per second (fps). The video delivery system then uses two different classifiers to determine a boundary point between frames to mark the start point of the end credits. The start point of the end credits may be when the main content (e.g., the filmed content of the video) transitions into the end credits, which is typically a screen with mostly text. The first classifier may classify each frame as containing end credits content or not. This analysis may be a computationally extensive process and require using more layers in the model to perform the classification than the second classifier. The output of the first classifier classifies the frames as either including end credits content or not including end credits content, and also includes a classification score that represents the confidence level of the model's prediction. The confidence level may reflect the probability that the corresponding frame includes end credits content.

The classification scores are then input into the second classifier, which refines the classification scores. The second classifier may fuse inter-frame information together. The inter-frame information may be information from other frames. For example, second classifier may analyze classification scores from neighboring frames, and may also use secondary information (e.g., information other than the classification scores or content from the images) to refine the classification scores. The refined classification scores may be more robust and precise compared with the initial classification scores because the inter-frame information may help eliminate some noise. Because the second classifier is refining the classification scores instead of analyzing image content, the second classifier may include fewer layers compared to the first classifier because the analysis of the classification scores is along a single dimension and not multiple dimensions. Also, the second classifier can run the inter-frame analysis much faster than the first classifier because the second classifier is analyzing classification scores and the first classifier is analyzing the content of the video. Though the first classifier could also be used to perform an inter-frame analysis by using a set of neighboring frames as the input instead of a single frame, this kind of inter-frame analysis would take a longer time because the classifier needs to analyze the contents for multiple frames every time.

Once the two classifiers are run, the system can select an optimal boundary point between frames based on the refined classification scores. For example, the boundary point may indicate when the main content from the video stops and the end credits start.

By using the second classifier, the system performs the overall process of determining the start of the end credits more accurately and faster compared to using just one classifier or performing the process manually. If the inter-frame information is not used, then the classification scores may not be as accurate. Also, if the inter-frame information is used in the first classifier, the process would be slower and also more complicated because the content in neighboring frames is analyzed instead of classification scores. By removing the inter-frame analysis from the first classifier and using the second classifier to analyze classification scores and not content of the neighboring frames, the second classifier improves the processing time of determining the boundary point in addition to more accurately determining the boundary point.

Also, there may be multiple points where a frame may be considered as having end credit content falsely or not considered as having end credit content falsely. For example, before the end credits occur, there may be frames that look like end credits are starting, such as an intro may have text scrolling, or some part of the video may have text in the frame. This may be falsely interpreted as being part of the end credits. Also, during the end credits, some frames may be interpreted as not including end credit content, such as during the end credits, an interlude of filmed video may be included. This interlude may be interpreted as not including end credit content, and possibly the restarting of the end credits after the interlude may be falsely considered the start of the end credits. While some of these false interpretations may be avoided by the manual setting of the end credits start, when performing the analysis automatically, the process does not have the benefit of an administrator instinctively knowing when the end credits start. Accordingly, the second classifier may be used to limit the false positives or false negatives.

System Overview

FIG. 1 depicts a simplified system 100 for selecting a boundary point for the start of end credits in videos according to some embodiments. A server system 102 may deliver videos to client 104 using a video delivery service. Although a single instance of server system 102 and client 104 is discussed, it will be understood that server system 102 may be interacting with multiple clients 104. Also, functions described may be distributed among multiple computing devices.

The end credits may start when a change from a first type of content to a second type of content occurs in a video. For example, the first type of content may be content that does not include any end credits, such as filmed video. The end credits may include text that may scroll or be displayed on different images that may list participants in the video, such as the producers, actors or actresses, etc. The end credits typically do not include any filmed video for the show or movie, but it is possible that some filmed video is shown in the background while the end credits is being displayed. Even if some filmed video is being shown while the end credits is being displayed, the system considers this still being a time when end credits are being displayed.

End credits detector 106 receives videos and can use a first classifier and a second classifier to select a boundary point in the videos that indicates the start of the end credits. As will be discussed in more detail below, the first classifier may classify whether a frame includes end credit content or not. The first classifier also outputs classification scores that indicate a confidence level of the prediction and reflects the probability that the corresponding frame includes end credit content or not.

A second classifier receives the classification scores and then can refine the classification scores using inter-frame information, which is information from frames other than the current frame. Additionally, secondary information (e.g., information not received from the first classifier or from the video content) may also be used, such as contextual, audio, subtitle, and user behavior information. The second classifier outputs the refined classification scores. End credits detector 106 then selects an optimal boundary between the frames using the refined classification scores to indicate the start of the end credits.

Video delivery system 108 coordinates the delivery of videos to client 104. For example, an interface 112 on client 104 may include a media player that is playing a video. In some embodiments, video delivery system 108 may determine when the end credits start playing on a video by monitoring the playback time of the video. When the video reaches the boundary between a frame that does not include end credit content and a frame that includes end credit content, video delivery system 108 may cause an end credits interface feature 114 to be enabled in interface 112. For example, end credits interface feature 114 may be a menu item that provides some action, such as allowing the user to play the next episode in a show or play related movies. In other embodiments, video delivery system 108 may send the boundary point to client 104, which then sends a request for end credits interface feature 114 when the boundary is reached. In some embodiments, end credits interface feature 114 may be automatically displayed when the end credits start. If the user does not want to watch the end credits, then end credits interface feature 114 provides the user with a convenient method to watch a next video, which may increase the user's viewing time on the video delivery service.

A video delivery service may offer many videos that client 104 can view. For example, client 104 may view shows that include multiple episodes and/or movies. To determine boundary points for all the videos in the video delivery service, end credits detector 106 automatically performs the classification to determine the boundary point. Because the automatic classification is performed, the boundary point may be more accurate than a manually-set boundary point. Further, end credits detector 106 may perform the analysis of the video to determine the boundary point quicker than using a manual selection process. Additionally, the use of the second classifier to refine the initial classification scores provides a more precise selection of the boundary point by eliminating noise in the classification scores. Also, the use of the second classifier, which includes fewer layers than the first classifier, improves the speed of the inter-frame fusion compared with implementing the inter-frame fusion in the first classifier. The second classifier may also be needed to detect false positives or false negatives because the automatic process is being used instead of a manual process.

First Classifier

Figure 2:
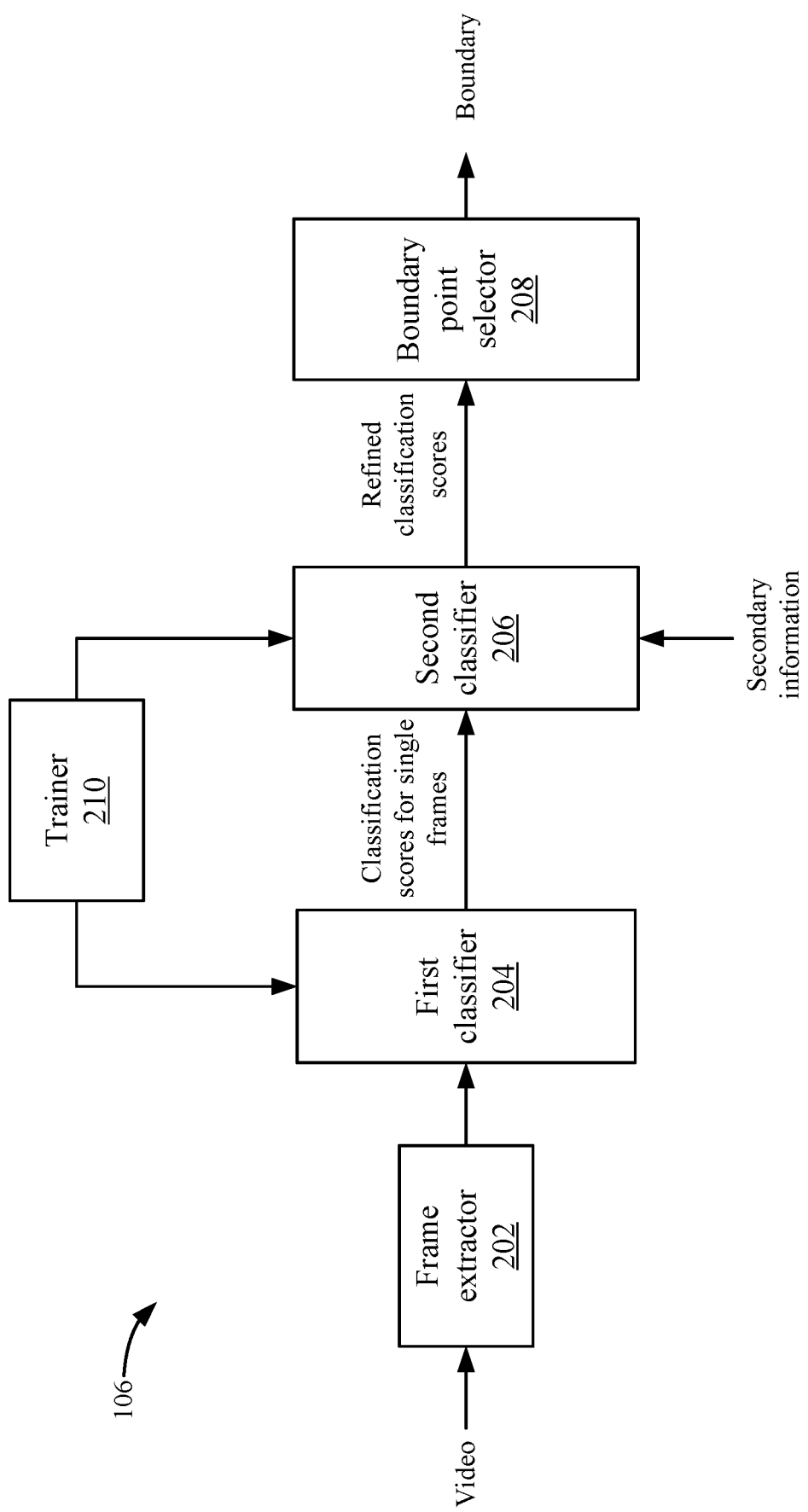
FIG. 2 depicts a more detailed example of an end credits detector according to some embodiments.

FIG. 2 depicts a more detailed example of end credits detector 106 according to some embodiments. End credits detector 106 includes a frame extractor 202, a first classifier 204, a second classifier 206, and a boundary point selector 208.

Frame extractor 202 receives a video and extracts the frames near the end of the video using a sampling rate, such as a one frame per second sampling rate. This extracts images that can be analyzed to determine whether the images include end credits content. Frame extractor 202 may use a threshold, such as 3-10 minutes before the end of the video to extract the frames. Although analysis of only a partial number of frames of the video is described, end credits detector 106 may analyze all of the frames of the video. However, it is typically expected that videos include end credits within a certain time period at the end of the video. Extracting the frames at the end of the video may increase the efficiency of the end credits detection as a large amount of frames do not need to be analyzed. In some embodiments, the last 200 seconds for episodes in television shows or the last 600 seconds for movies may be used.

First classifier 204 may then classify the extracted frames and generate classification scores for each frame. In some embodiments, first classifier 204 may be a prediction network, such as a neural network. Different types of neural networks may be used, such as a deep convolutional neural network (CNN), to extract features, such as high-level representative and semantic features, for the frames and generate classification scores that represent the confidence level of the models' prediction of whether a frame includes end credit content. The features may be characteristics of the video content that are related with the end credit contents or patterns, such as whether the frame has text or has a large amount of black regions, etc. The semantic information for the extracted features by first classifier 204 is related with the supervision information that is used to train the model of first classifier 204. Here the supervision information means the ground truth for the training samples in the training stage (e.g., the training labels). As first classifier 204 uses the labelled end-credit-frame/not-end-credit-frame to train the model, the resultant features are related with end-credit content. First classifier 204 may extract the features, and use those features to generate the classification scores. For example, in a simple example, a frame that includes text scrolling on the screen may be labeled as including end credit content and a frame that does not include text, but rather includes a scene of people may be labeled as not including end credit content. Further, a frame that includes only one line of text may have a lower classification score than a frame that includes multiple lines of text because the multiple lines of text may be more indicative of including end credit content than only a single line of text.

The neural network includes an output layer configured as a binary classification layer that classifies the frame as including end credit content or not including end credit content. The binary classification layer thus includes two output nodes, one node for a classification score for including end credits content and one node for a classification score for not including end credits content. The node with the higher score is used as the prediction of whether the frame includes end credits content or not. The classification score of the node for including end credit content is used. First classifier 204 includes several layers. Each layer's output has higher level semantic information compared with its input, i.e., the output of previous layer. That means, for each layer, when the information goes through the input of the layer to the output of the layer, the layer may re-extract and refine the information to make it more semantic and more related with the final supervision information used during training. Here the supervision information is the end credit label, so with the layers go forward, the corresponding features are more and more related with the end credit patterns. Although a deep CNN model is used, other architectures may be used, such as other types of neural networks. However, the other architectures may be used that include the last one or more layers replaced by a binary classification layer. The binary classification layer is used to classify the frame as either including end credits content or not including end credits content.

A trainer 210 may train first classifier 204 using a supervised model. For example, trainer 210 may input various frames that have been labeled as either including end credits content or not including end credits content. The frames may be labeled with labels that indicate whether the frames include end credits content. Then, first classifier 204 may output the classification scores for those frames. Because trainer 210 knows whether these frames include end credits content or do not include end credits content, first classifier 204 may be trained to output the correct classification scores by adjusting first classifier 204, such as by adjusting the weights of nodes in first classifier 204 that are used to classify an image.

First classifier 204 outputs the classification scores for the frames to second classifier 206. Second classifier 206 may receive an input of multiple classification scores and then output a refined classification score for each classification score. It is noted that second classifier 206 may not refine all the classification scores.

Second classifier 206 may apply a neural network, such as a shallow CNN model, to refine the classification scores. The shallow CNN may include fewer layers than the deep CNN model because the shallow CNN is classifying the classification scores and not features of video content. Second classifier 206 may perform inter-frame fusion on the classification scores, which is only in one dimension and does not require a deep network architecture (e.g., greater than two convolution layers) to analyze the one-dimensional classification scores. In some embodiments, the shallow CNN model includes one to two convolution layers that will be described in more detail below.

Second classifier 206 may connect several classification scores from neighboring frames together to fuse a respective classification score with local inter-frame information to obtain better classification scores. Using the inter-frame information may refine the classification scores to remove noise that may have affected the classification score for one of the frames in a neighboring frame set. For example, if a series of classification scores is 0.99, 0.99, 0.40, 0.99, and 0.99, with 0 representing not including end credit content and 1 representing including end credit content, then the 0.40 score in between the 0.99 scores may not be accurate. It is possible that the frame may have shown an image without a lot of text, but this image should be considered as still showing end credits content. Second classifier 206 may then adjust the 0.40 score, such as increasing the score based on the inter-frame information.

Also, second classifier 206 may receive secondary information that is used to perform the inter-frame fusion. The initial classification scores are augmented using the secondary information. Examples of the secondary information may include textual, audio, sub-title, and user behavior information that is fed into the neural network to fuse the inter-frame classification scores together. The contextual information may be the time that the end credits start for similar episodes of the show. The audio information may include when audio stops for the video because the end credits may typically not include audio (e.g., characters speaking instead of music may be the audio detection). Subtitle information may be used to determine when subtitles, which sometime indicates when the end credits start. User behavior information may be information from the behavior of users of the video delivery service.

For the contextual information, second classifier 206 can consider whether a frame in an episode $E_1$ is at a position $p_i$ that is similar to the corresponding frame in a second episode $E_2$ at a position $p_i$ or nearby, where episodes $E_1$ and $E_2$ are different episodes from the same TV show or season. Second classifier 206 is using the fact that different episodes of the same show or the same season will have the same or similar end credits and since they include the same content, may last the same amount of time. The similarity between different frames can be measured by comparing features of the images, such as scale-variant feature transform (SIFT) features. This analysis may be performed offline to determine the position $p_i$ between multiple episodes.

The audio/subtitle information may be extracted using feature extraction methods. The feature extraction may extract audio and subtitle information from the video. When the audio ends and/or subtitles end, the system can determine that the end credits may have started.

For the user behavior information, the system can plot the distribution of the last quit time for different users or for the specific video. The quit time may indicate when the user ended watching the video because the end credits had started. The peak of distribution has a good relationship with the actual end credits starting point.

Second classifier 206 uses the above secondary information to augment the inter-frame information. For example, a frame with a score of 0.40 that is located after when a prior episode of a show started its end credits may be likely to be part of the end credits. Similarly, if the frame is after a time when users typically quit the video, there is no subtitles or speech, then the classification score may be revised higher. For example, for 200 frames, second classifier 206 has a one-dimensional score vector [s1, s2, . . . , s200] from first classifier 204. And from secondary information, second classifier 206 may receive a one-dimensional score vector [r1, r2, . . . , r200] based on audio information, and another one-dimensional score vector [t1, t2, . . . , t200] based on contextual information. Then second classifier 206 can form a two-dimensional score vector [(r1, s1, t1), (r2, s2, t2), . . . , (r200, s200, t200)], where the added dimension is the depth dimension, and then in the following layer second classifier 206 can resolve the vector to determine a result, such as by applying a one-dimensional convolution operation with depth equal to 3.

Second classifier 206 applies the inter-frame fusion, which takes into account classification scores from neighboring frames, and not the actual content in the frames. This reduces the computation amount significantly because for each frame, only its classification score (e.g., one dimension) is passed through the neural network one or more times and not the original frame itself (e.g., high dimension). The refined classification scores may be more robust and more precise as compared with the initial classification scores.

By having second classifier 206 perform the inter-frame fusion, the classification of whether a frame includes end credits content is more accurate than using a single classifier. Also, if first classifier 204 performed the inter-frame fusion, the fusion operation will be time consuming. Also, due to the structure of the second classifier using convolution operators with depth greater than 1, second classifier 206 can also be used to fuse the information from multiple sources (e.g., the secondary information), which can further improve the quality of end credit detection results.

Boundary point selector 208 receives the refined classification scores and can then select an optimal boundary point between frames. The boundary point may attempt to predict the starting point of the end credits (e.g., a point at which a frame that does not include end credits content and a first frame that includes end credits content in the video). Boundary point selector 208 may use a splitting criterion to determine whether to select a boundary point between the frames based on the classification scores. This process will be described in more detail below. The output of boundary point selector 208 is the boundary to use for when the end credits start in the video.

Video delivery system 108 then uses the boundary to determine when to perform actions during playback of the video. For example, as discussed above, video delivery system 108 may monitor the playback of the video in interface 112. When the boundary point is reached in the video, video delivery system 108 enables end credits interface feature 114. In other embodiments, video delivery system 108 sends the boundary point to interface 112, which then sends a request for end credits interface feature 114 when the boundary point is reached.

In some embodiments, the above analysis may be performed in the background as the video is viewed by client 104. This may be useful in live events that have not been pre-recorded. The use of end credits detector 106 can be performed automatically and determine when the end credits start as live video is received. Accordingly, the manual process as described in the Background may not feasibly be used as a user would have to watch the entire live broadcast and then input when the end credits start. However, end credits detector 106 may perform the analysis by receiving the frames of the live video as it is broadcast live. Once the end credits are detected, end credits detector 106 may output the boundary to video delivery system 108 in real-time. Then, video delivery system 108 can enable end credits interface feature 114. In the live broadcast, the system can sequentially extract frames from the live stream, apply the first classifier 204 to calculate the initial classification score, and then apply the second classifier 206 to calculate the refined score. As the live broadcast usually has several seconds delay, the system can use this delay time to compute the score for the right-window of boundary point (and for the left-window as well), and thus get the final boundary score. If the boundary score is greater than a particular threshold value for the first time, it may be considered a start point of end credits. Using the classifiers makes it possible to detect the end credits within a time required during a live broadcast.

Trainer 210 may also train second classifier 206. The training is performed by inputting classification scores into shallow CNN that are labeled with refined classification scores and monitoring the output of second classifier 206.

Figure 3:
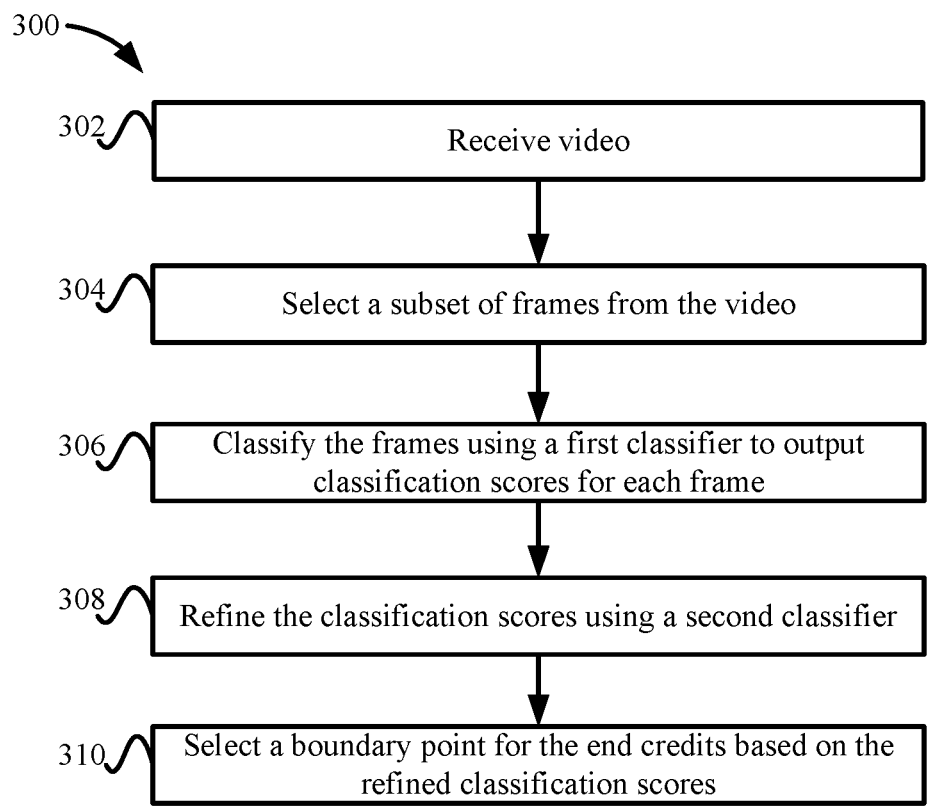
FIG. 3 depicts a simplified flowchart of a method for selecting a boundary point according to some embodiments.

FIG. 3 depicts a simplified flowchart 300 of a method for selecting a boundary point according to some embodiments. At 302, end credits detector 106 receives a video. Then, at 304, end credits detector 106 selects a subset of frames from the video.

At 306, first classifier 204 classifies the frames to output classification scores for each frame. The classification scores may predict whether a frame includes end credits content.

At 308, a second classifier 206 refines the classification scores. At 310, boundary point selector 208 selects the boundary point for the end credits based on the refined classification scores. The boundary point may be inserted as a marker in the video or sent separately to interface 112 to indicate to video delivery system 108 and/or interface 112 when the end credits start. Video delivery system 108 or interface 112 then uses the marker to determine when to enable end credits interface feature 114.

First Classifier 204

Figure 4:
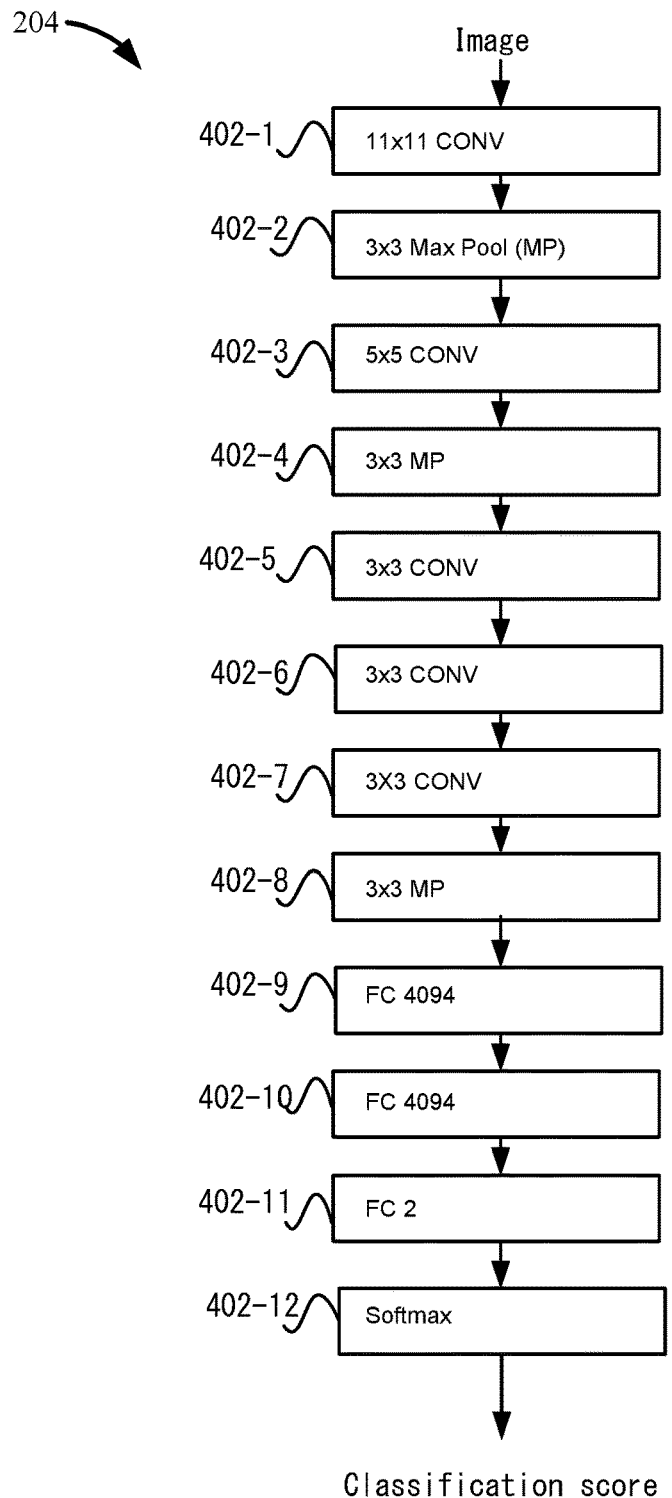
FIG. 4 depicts a more detailed example of a first classifier according to some embodiments.

FIG. 4 depicts a more detailed example of first classifier 204 according to some embodiments. Although this structure of first classifier 204 is described, it will be understood that other architectures may be used. However, in some embodiments, first classifier 204 includes more layers than second classifier 206.

At 402-1, first classifier 204 includes a convolution layer, which may include multiple convolution filters. In some embodiments, the convolution operator may have a 11×11 kernel size, with a stride S. The convolution operator may be one-dimensional or two-dimensional. Each filter is convolved across the width and height of the image, and a node computes products between the entries of the filter and the input at any position. As the filter is moved over the width and height of the image, the convolution layer produces a one-dimensional or two-dimensional activation map that gives the responses of that filter at every scheduled position. The convolution layer may extract features of the image.

A max pooling layer (MP) layer at 402-2 takes a maximum between every pair of nodes from the convolution layer to form a new compressed representation. In some embodiments, the max pooling operator may have a 3×3 kernel size, with a stride S greater than 1. A max pooling operator may be one-dimensional or two-dimensional and may be applied over specific axis such that the max pooling function takes the maximum values across the specific axis. The max pooling may combine the outputs of node clusters from the convolution layer into a single node (e.g., neuron) in the next convolution layer. For example, the max pooling layer uses the max value of each of the cluster of nodes of the prior layer.

At 402-3, another convolution layer of the size 5×5 is used to filter the representation received from the max pooling layer. After the convolution layer, another 3×3 max pooling layer is used at 402-4. Thereafter, at 402-5, 402-6, and 402-7, three convolution layers are used followed by a max pooling layer at 402-8. The above layers are necessary to extract the features of significance from the video content. This number of layers are needed because the neural network needs enough number of layers to extract high-level semantic representation from the original image.

Then, at 402-9, a fully-connected hidden layer is shown. The output of the max pooling layer at 402-8 may include the useful features of the image. The fully-connected layer at 402-9 may contain nodes that are connected to all the nodes in the previous layer. A fully-connected layer may have a number of filters K equal to 4,096. The previous convolution or pooling layers have local receptive field (e.g., each node in the output layer is only connected with the nodes from a small corresponding region in the input layer), the layers generate local features. The two fully-connected layers generate global features, as each node in the output layer is connected with all the nodes in the input layer. Then, a fully-connected layer at 402-11 of a size of two nodes is connected to the prior fully-connected layer. This layer determines the binary output of whether the image includes end credits content. Because a binary output is needed, this fully-connected layer only includes two neurons. The soft max layer can normalize the scores to interval [0, 1]. For example, for original score vector (s1, s2), where s1 is the score of the first node, and s2 is the score of the second node, the soft-max layer converts the score vector to (exp(s1)/(exp(s1)+exp(s2)), exp(s2)/(exp(s1)+exp(s2))). The output of the soft max layer is the classification score for each node.

Second Classifier 206

Figure 5:
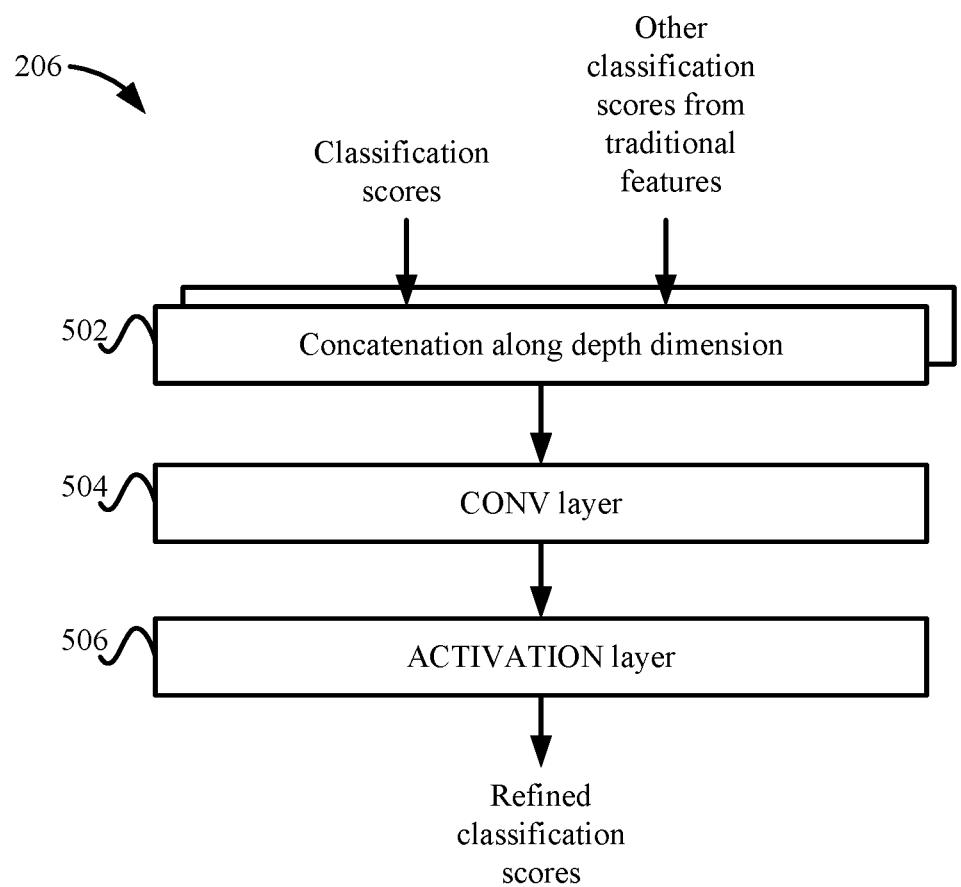
FIG. 5 depicts a more detailed example of a second classifier according to some embodiments.

FIG. 5 depicts a more detailed example of second classifier 206 according to some embodiments. Second classifier 206 receives the classification scores from first classifier 204 and other classification scores from traditional features at a layer 502. Concatenation layer 502 may reformat the scores from different sources, such as performing a concatenation along a depth dimension. As discussed above, second classifier 206 can form a two-dimensional score vector [(r1, s1, t1), (r2, s2, t2), . . . , (r200, s200, t200)], where the added dimension is the depth dimension, and then in the following layer second classifier 206 can resolve the vector to determine a result, such as by applying a one-dimensional convolution operation with depth equal to 3. These classification scores may classify frames that either included end credits content or not included end credits content.

A convolution layer 504 receives the classification scores. The convolution layer receives all of the classification scores and can analyze the classification scores together. According to the convolution operation, each node in the output layer will be connected to a set of neighboring nodes in the input layer, thus it can provide the ability of fusing neighboring information (inter-frame fusion). Here, the nodes in input layer may be classification scores from the first classifier, or scores from traditional features.

An activation layer 506 includes a function that normalizes the output of previous convolution layer to a score vector with probability values which are in interval [0, 1]. The activation layer receives all of the classification scores and use a "Sigmoid" function to convert the input values to output values in interval [0, 1]. The output of the activation layer is refined classification scores.

Second classifier 206 requires less layers than first classifier 204 because first classifier 204 is extracting features from the video content, which is multi-dimensional data. Second classifier 206 is refining the classification scores, which are in a single dimension. The analysis of data in a single dimension is less computationally intensive than analyzing multi-dimensional data.

Boundary Selection

Figure 6:
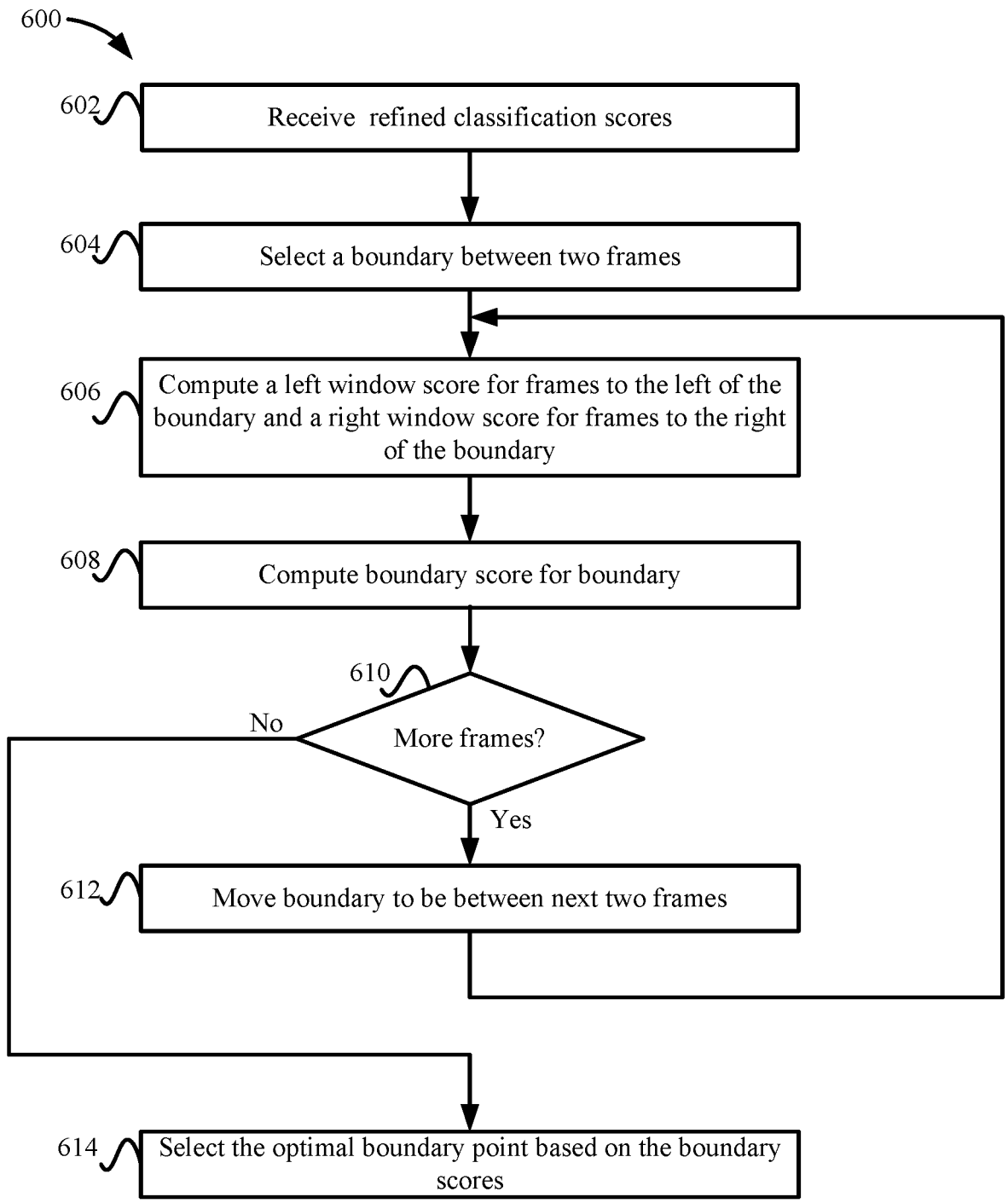
FIG. 6 depicts a simplified flowchart of a method for selecting an optimal boundary point between frames according to some embodiments.

FIG. 6 depicts a simplified flowchart 600 of a method for selecting an optimal boundary point between frames according to some embodiments. At 602, boundary point selector 208 receives the refined classification scores. Then, at 604, boundary point selector 208 selects a boundary between two frames. For example, boundary point selector 208 may start in between a first frame and a second frame and continually move the boundary one frame for each iteration.

At 606, boundary point selector 208 computes a left-window score for frames to the left of the boundary and a right-window score for frames to the right of the boundary. The scores may summarize the scores in the window, such as the scores may be an average score for the frames in the window, a median, or use other functions to summarize the score. For example, all the scores for the frames to the right of the boundary may be averaged to generate a right-window score and all scores for the frames to the left of the boundary may be averaged to generate a left-window score. Another example is that the ratio of the scores greater than 0.5 in the right-window may be used as right-window score, and the ratio of scores less than 0.5 in the left-window may be used as left-window score. The use of the average scores may filter out some noise that may occur between frames.

At 608, boundary point selector 208 computes a boundary score for the boundary. The boundary score may be determined based on the following function:

$$f(p_k) = \frac{1}{R} \sum_{p_i \in W_R(p_k)} I_{s(p_i)>0.5} + \frac{1}{R} \sum_{p_j \in W_L(p_k)} I_{s(p_j)<0.5}$$

$$W_R(p_k) = \{p_{k+1}, p_{k+2}, \ldots, p_{k+R-1}, p_{k+R}\}$$

$$W_L(p_k) = \{p_{k-R}, p_{k-R+1}, \ldots, p_{k-2}, p_{k-1}\}$$

In the above, the function $s(p_k)$ is the refined score for the frame at $p_k$, the variable $W_R(p_k)$ and the variable $W_L(p_k)$ are the variable's $p_k$ right window and left window, respectively (with radius=R). The function $I_{s(p_k)}$ is the indicator function, which returns 1 when the function $s(p_k)$ is true and returns 0 otherwise. The function $f(p_k)$ measures the degree of abrupt changes for the scores in right window $W_R(p_k)$ and left window $W_L(p_k)$. The optimal boundary point corresponds to the maximum value of the function $f(p_k)$. That is, in the equation, the score may measure the degree of abrupt changes for the scores between the right window and the left window.

At 610, boundary point selector 208 determines if more frames need to be processed. For example, the process may continue until the boundary point has been moved to after the last frame at which time there are no more frames in the right window. Also, the search may be stopped before the end of the video because it may be assumed that there are no end credits.

If there are more frames, then at 612, boundary point selector 208 moves the boundary to be between the next two frames. Then the process reiterates to 606 to compute a new left-window score and a new right-window score. The left-window score and the right-window score change due to the boundary moving one frame further to the right. This changes the number of frames to the left of the boundary and to the right of the boundary. This process continues as a new boundary score is computed at 608.

When no more frames are to be processed, boundary point selector 208 then selects an optimal boundary point based on the boundary scores at 614. For example, boundary point selector 208 selects the maximum value of the value $F(p_k)$. The maximum value may indicate the boundary that had the most abrupt change from the left window to the right window.

Figures 7A, 7B:
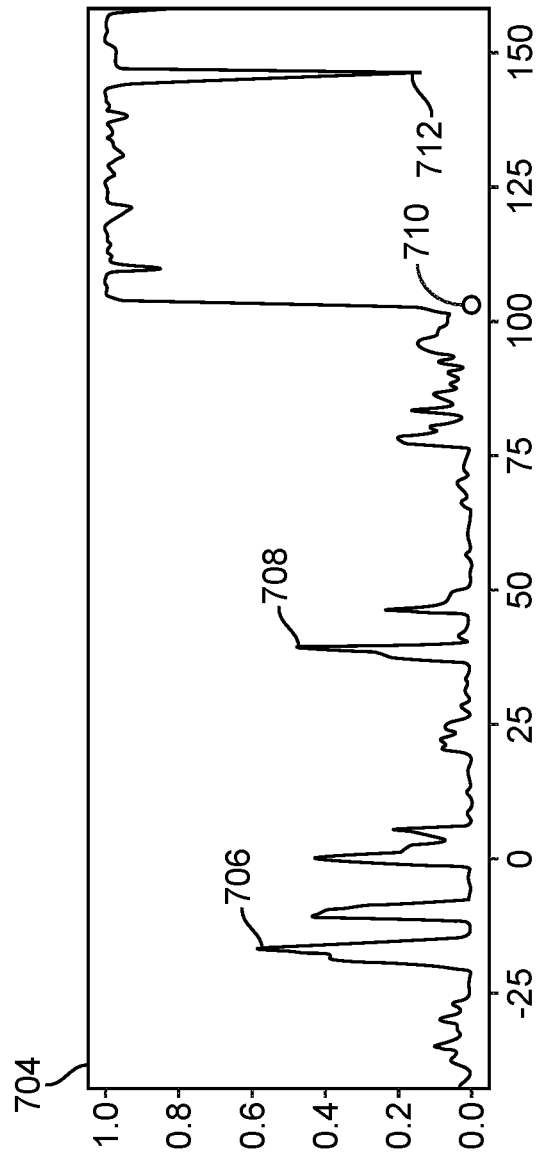
FIG. 7A depicts an example of the scores that are calculated for frames according to some embodiments.
FIG. 7B depicts a graph of the scores according to some embodiments.

FIG. 7A depicts an example of the scores that are calculated for frames and FIG. 7B depicts a graph 704 of the scores according to some embodiments. In FIG. 7A, only a portion of the scores for the frames of the video are shown at 702. Each score may indicate the probability that the frame includes end credits content. The classification scores may go from 0 to 1.0, with 0 being the lowest confidence and 1.0 being the highest confidence. For frames 99 to 102, the classification score is relatively low, ranging from 0.08 to 0.06. At frame 102, the classification score jumps to 0.154, which is relatively low. However, at frame 103, the classification score jumps from 0.154 to 0.612. After frame 103, the score is above 0.958 for the rest of the frames. In this example, end credits detector 106 may determine the boundary point to be between frame 102 and 103, thus indicating that frame 103 is the start of the end credits due to the abrupt change in scores.

In a graph at 704 in FIG. 7B, the classification scores for the entire video may be shown. The X axis shows an index of the frame numbers. In this case, the frame index in the video may go from −50 to 150, but it can also go from −M to N frames. At 710, the point where the end credits start is noted at frame 103. At this point, a large increase in the graph is shown.

However, there are points at which the classification scores spike in a similar manner, such as at points 706 and 708. These points may be where some text was included in the video, but the text was possibly not end credits text. However, the automatic classification may have indicated that this frame may include end credits content. These are examples where false positives may result. However, second classifier 206 may have refined these scores to lower the classification scores. That is, second classifier 206 may have received classification scores that are even higher than indicated on this graph. With the refinement, second classifier 206 may have lowered the classification scores due to the inter-frame fusion information or secondary information. For example, the frames near the points of 706 and 708 have lower scores and second classifier 206 may have lowered the classification scores of the frames at 706 and 708. If the refinement was not used, it is possible that these scores at points 706 and 708 may have falsely classified these frames as frames that include end credits content.

Also, at 712, the classification score may dip even though the end credits may still be going on. However, this may just be a point where the end credits stopped for a little bit, such as when an end of the video teaser occurs. This dip may not be considered the start of the end credits after the end credits may start soon after the break. The use of the two windows, the left window and right window, may avoid calling the point at 712 the start of the end credits. This is because the left window includes the frames of the video that have high classification scores and thus, boundary point selector 208 would not consider the point at 712 to be a boundary point. Rather, the point at 710 with the left window including mostly lower classification scores and the right window including mostly higher classification scores would rate as a higher probably as the start of the end credits.

CONCLUSION

Accordingly, end credits detector 108 can automatically mark the start of the end credits efficiently. The use of the two classifiers accurately labels the start of the end credits in addition to performing the computation quicker than using one classifier. This results in an improvement of the scores in addition to an improvement of the device that is calculating the scores. Further, the refinement may catch false positives that may initially classify frames as including end credit content.

System

Figure 8:
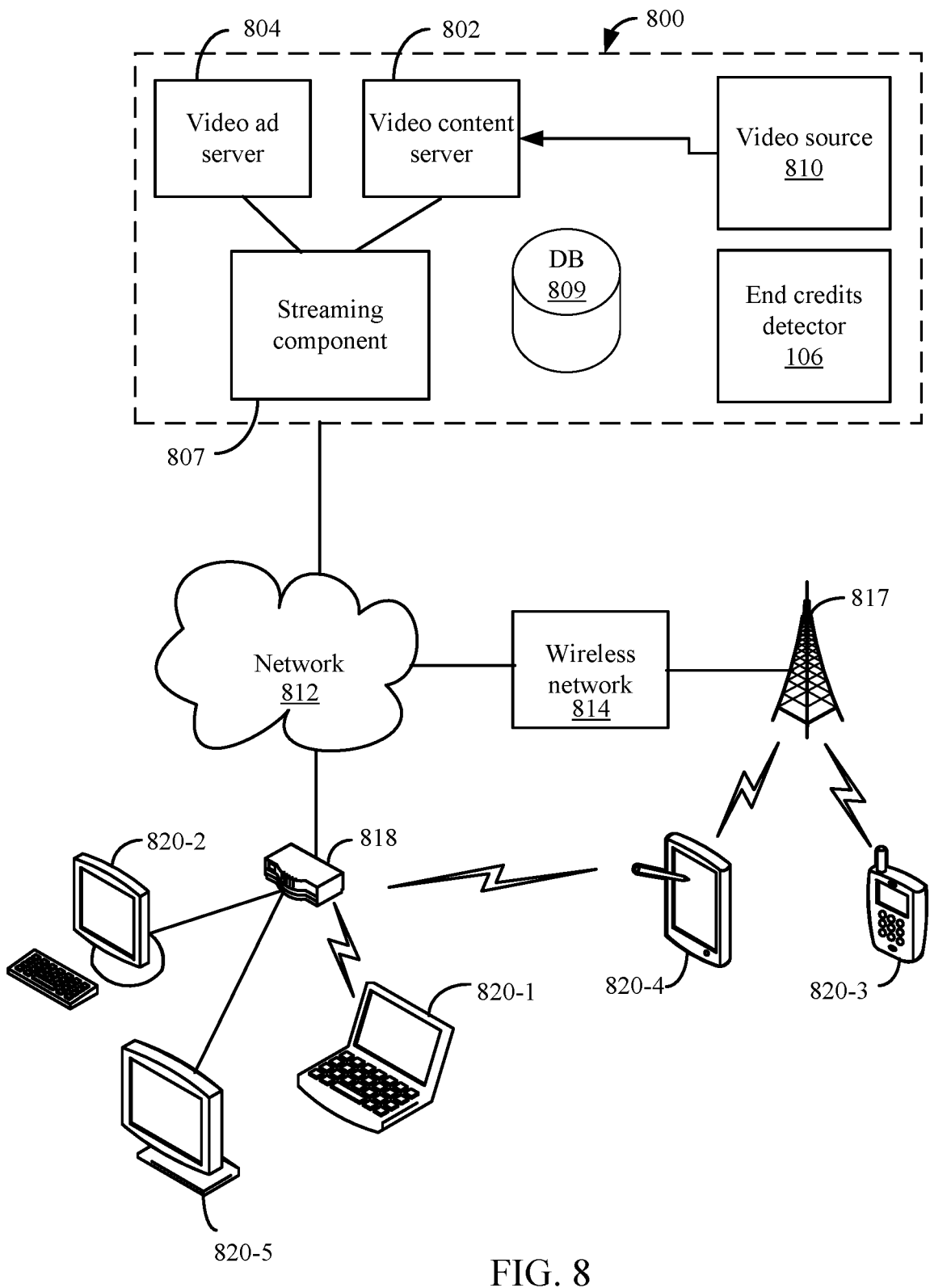
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 800, a public service message, or some other information. The video advertising server 804 may serve the video advertising segments as directed by a user interface controller (not shown).

The video streaming system 800 also may include end credits detector 108.

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices 820 may be in communication with the video streaming system 800, via the data communication network 812 and/or other network 814. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 817 for a wireless telephony network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HTTP and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
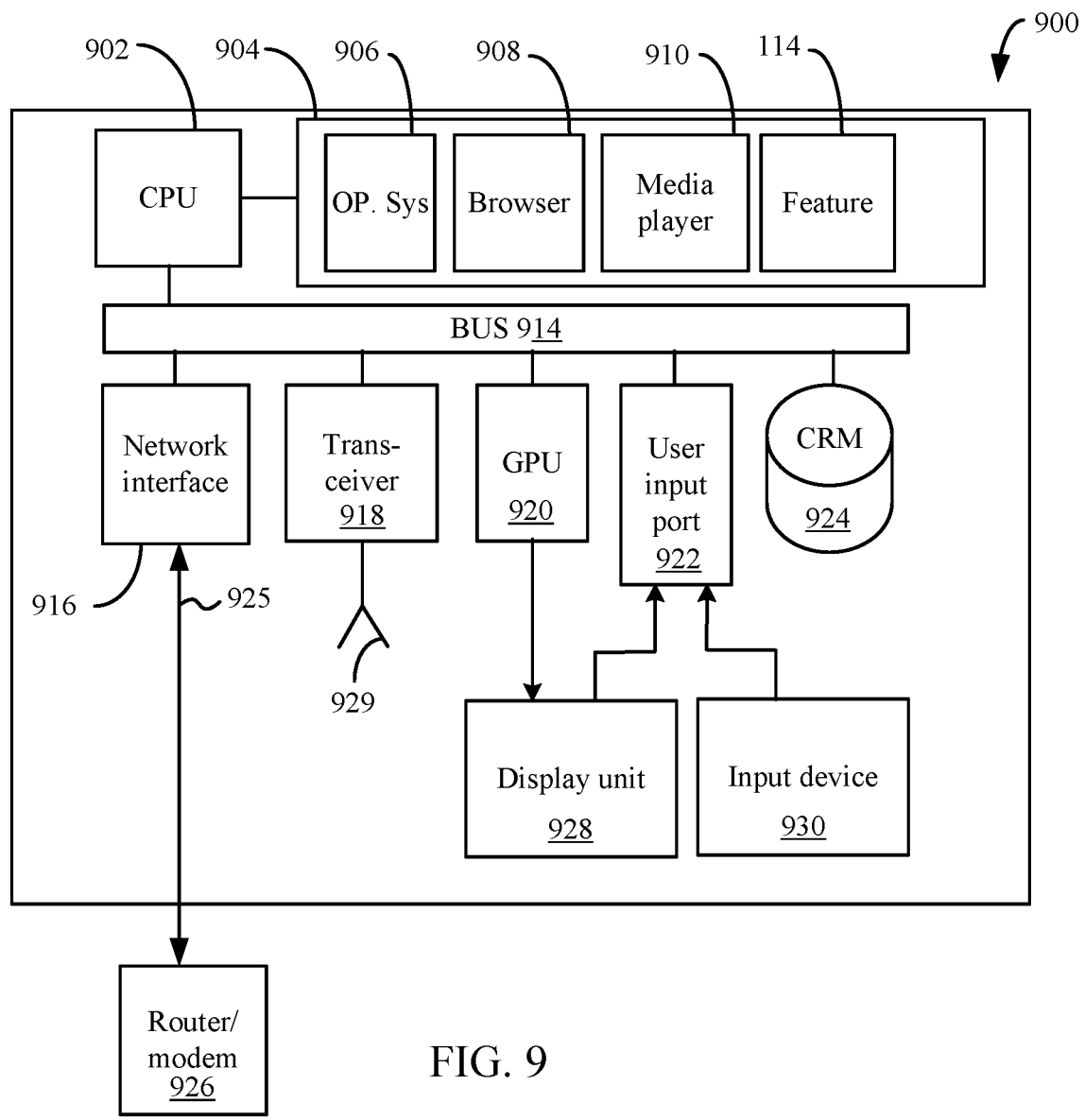
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The modules may further include end credits interface feature 114. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device (CRM) 924 may store the modules 906, 908, 910 and 912 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computing device, a set of frames from a video at a first classifier;
   classifying, by the computing device, the set of frames with a set of classification scores indicating a confidence that a frame contains end credit content using the first classifier, the first classifier using a first model that classifies content from the set of frames;
   after performing the classifying by the first classifier, performing:
   receiving, by the computing device, at least a portion of the set of classification scores for at least a portion of the set of frames from the first classifier;

adjusting, by the computing device, a classification score in the set of classification scores for a frame to another classification score using one or more classification scores from one or more of the at least the portion of the set of frames that are considered to be neighboring frames to the frame using a second classifier, the second classifier using a second model that classifies classification scores from the first classifier and not content of the at least the portion of the set of frames that was used by the first classifier; and selecting, by the computing device, a boundary point in the set of frames between a first frame in the set of frames that is considered to not include end credit content and a second frame in the set of frames that is considered to include end credit content using the at least the portion of the set of classification scores with the classification score being replaced with the adjusted classification score.

2. The method of claim 1, wherein classifying the set of frames using the first classifier comprises:
receiving a frame in the set of frames;
analyzing content in the frame; and
selecting between a first classification node that the frame includes the end credits content and a second classification node that the frame does not include the end credits content.

3. The method of claim 2, wherein the classification score indicates the confidence in selecting one of the first classification and the second classification.

4. The method of claim 2, wherein the first classifier is configured with output nodes that output a first classification score for the first classification node and a second classification score for the second classification node.

5. The method of claim 1, further comprising:
inputting the at least the portion of the set of classification scores into the second model; and
adjusting at least a portion of the set of classification scores to different classification scores based on the one or more classification scores of the one or more neighboring frames in the set of frames.

6. The method of claim 1, wherein adjusting the classification score using the second classifier comprises:
inputting the classification score into the second model; and
adjusting the classification score based on secondary information for the frame or the neighboring frames.

7. The method of claim 1, wherein adjusting the classification score using the second classifier comprises:
changing a classification of the frame from including end credit content to not including end credit content or from not including end credit content to including end credit content based on the one or more classification scores of one or more of the at least the portion of the set of frames.

8. The method of claim 1, wherein selecting the boundary point comprises:
selecting a prospective boundary point;
calculating a left window score based on classification scores for at least a portion of frames before the prospective boundary point;
calculating a right window score based on classification scores for at least a portion of frames after the prospective boundary point; and
calculating a boundary score based on the left window score and the right window score.

9. The method of claim 8, further comprising:
continuing to select different prospective boundary points;
calculating the left window score and the right window score based on the different boundary points; and
calculating different boundary scores for the different prospective boundary points.

10. The method of claim 9, further comprising:
selecting one of the different boundary scores for the boundary point.

11. The method of claim 10, wherein the selected one of the different boundary scores is a maximum score out of the different boundary scores.

12. The method of claim 1, further comprising:
extracting the set of frames from the video based on a point in the video.

13. The method of claim 12, wherein extracting the set of frames comprises:
extracting frames after a time in the video to form the set of frames.

14. The method of claim 1, wherein:
the video is received during a live broadcast, and
the boundary point is selected during the live broadcast.

15. The method of claim 1, further comprising:
selecting neighboring frames to the frame; and
connecting the classification score in the set of classification scores for the frame with the one or more classification scores from the one or more of the at least the portion of the set of frames that are considered to be neighboring frames to the frame.

16. A non-transitory computer-readable storage medium containing instructions, that when executed, control a computer system to be configured for:
receiving a set of frames from a video at a first classifier;
classifying the set of frames with a set of classification scores indicating a confidence that a frame contains end credit content using the first classifier, the first classifier using a first model that classifies content from the set of frames;
after performing the classifying by the first classifier, performing:
receiving at least a portion of the set of classification scores for at least a portion of the set of frames from the first classifier;
adjusting a classification score in the set of classification scores for a frame to another classification score using one or more classification scores from one or more of the at least the portion of the set of frames that are considered to be neighboring frames to the frame using a second classifier, the second classifier using a second model that classifies classification scores from the first classifier and not content of the at least the portion of the set of frames that was used by the first classifier; and
selecting a boundary point in the set of frames between a first frame in the set of frames that is considered to not include end credit content and a second frame in the set of frames that is considered to include end credit content using the at least the portion of the set of classification scores with the classification score being replaced with the adjusted classification score.

17. The non-transitory computer-readable storage medium of claim 16, wherein classifying the set of frames using the first classifier comprises:
receiving a frame in the set of frames;
analyzing content in the frame; and selecting between a first classification node that the frame includes the end credits content and a second classification node that the frame does not include the end credits content.

18. The non-transitory computer-readable storage medium of claim 16, further configured for:
   inputting the at least a portion of the set of classification scores into the second model; and
   adjusting at least a portion of the set of classification scores to different classification scores based on the one or more classification scores of the one or more neighboring frames in the set of frames.

19. The non-transitory computer-readable storage medium of claim 16, wherein adjusting the classification scores using the second classifier comprises:
   changing a classification of the frame from including end credit content to not including end credit content or from not including end credit content to including end credit content based on the classification scores of the neighboring frames in the set of frames.

20. The non-transitory computer-readable storage medium of claim 16, wherein selecting the boundary point comprises:
   selecting a prospective boundary point;
   calculating a left window score based on classification scores for at least a portion of frames before the prospective boundary point;
   calculating a right window score based on classification scores for at least a portion of frames after the prospective boundary point; and
   calculating a boundary score based on the left window score and the right window score.

21. An apparatus comprising:
   one or more computer processors; and
   a non-transitory computer-readable storage medium comprising instructions, that when executed, control the one or more computer processors to be configured for:
   receiving a set of frames from a video at a first classifier;
   classifying the set of frames with a set of classification scores indicating a confidence that a frame contains end credit content using the first classifier, the first classifier using a first model that classifies content from the set of frames;
   after performing the classifying by the first classifier, performing:
   receiving at least a portion of the set of classification scores for at least a portion of the set of frames from the first classifier;
   adjusting a classification score in the set of classification scores for a frame to another classification score using one or more classification scores from one or more of the at least the portion of the set of frames that are considered to be neighboring frames to the frame using a second classifier, the second classifier using a second model that classifies classification scores from the first classifier and not content of the at least the portion of the set of frames that was used by the first classifier; and
   selecting a boundary point in the set of frames between a first frame in the set of frames that is considered to not include end credit content and a second frame in the set of frames that is considered to include end credit content using the at least the portion of the set of classification scores with the classification score being replaced with the adjusted classification score.

* * * * *